Figure 1:
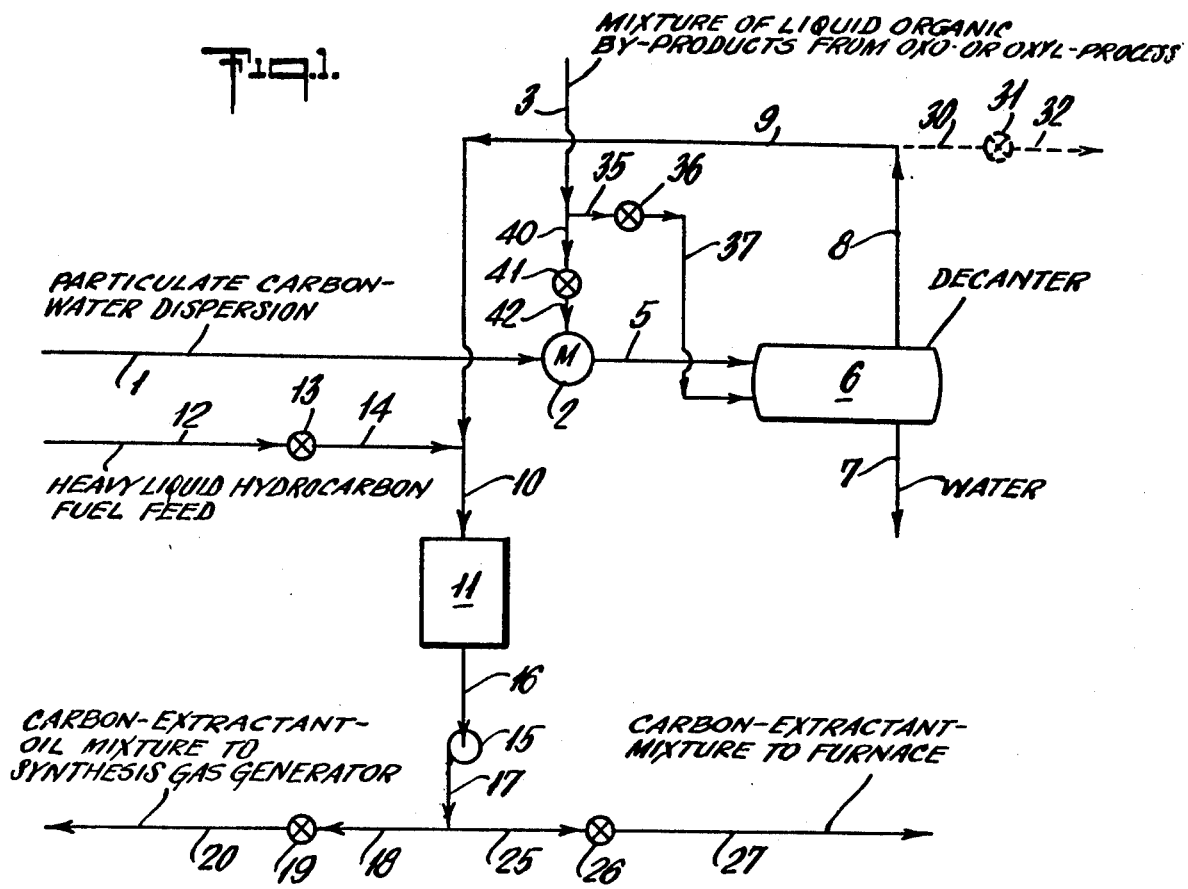

United States Patent [19]

Marion

[11] 4,016,102

[45] Apr. 5, 1977

[54] RECOVERY OF PARTICULATE CARBON FROM SYNTHESIS GAS

[75] Inventor: Charles P. Marion, Mamaroneck, N.Y.

[73] Assignee: Texaco Development Corporation, New York, N.Y.

[22] Filed: Apr. 30, 1976

[21] Appl. No.: 681,940

Related U.S. Application Data

[62] Division of Ser. No. 535,606, Dec. 23, 1974, Pat. No. 3,980,591.

[52] U.S. Cl. .............................................. 252/373
[51] Int. Cl.$^2$ ......................................... C01B 2/14
[58] Field of Search ...... 252/373; 48/196 R, 197 R, 48/212, 215; 260/449, 449.6, 604 HF

[56] References Cited

UNITED STATES PATENTS

| 2,987,386 | 6/1961 | Chapman et al. | 48/196 R |
| 2,992,906 | 2/1961 | Guptill | 252/373 UX |
| 2,999,741 | 6/1961 | Dille et al. | 48/196 R |
| 3,473,903 | 10/1969 | Paull et al. | 48/212 |
| 3,846,095 | 11/1974 | Crouch | 252/373 UX |
| 3,868,817 | 3/1975 | Marion et al. | 252/373 |

*Primary Examiner*—Howard T. Mars
*Attorney, Agent, or Firm*—T. H. Whaley; C. G. Ries; Albert Brent

[57] ABSTRACT

A process for recovering particulate carbon from the effluent gas stream from a partial oxidation synthesis-gas generator by scrubbing the effluent gas with water in a scrubbing zone to form a carbon-water dispersion, by mixing said dispersion with a liquid organic extractant comprising a mixture of the liquid organic by-products from the oxo or oxyl process so as to produce a clarified water layer and a carbon-extractant dispersion, by separating and recycling said clarified water to said scrubbing zone, and by introducing part or all of said carbon-extractant dispersion to said gas generator as at least a portion of the generator feedstock.

20 Claims, 1 Drawing Figure

RECOVERY OF PARTICULATE CARBON FROM SYNTHESIS GAS

This is a division of application Ser. No. 535,606 filed Dec. 23, 1974, now U.S. Pat. No. 3,980,591.

BACKGROUND OF THE INVENTION

1. Field of the Invention

This invention relates to a continuous process for recovering particulate carbon from synthesis gas, and particularly from carbon-water dispersions.

2. Description of the Prior Art

Raw synthesis gas leaving a partial oxidation synthesis gas generator comprises principally CO and $H_2$ together with minor amounts of finely divided carbon or particulate carbon. Preferably, the particulate carbon is removed from the effluent gaseous stream by contacting the gas with water in quenching and scrubbing zone. The water wets and agglomerates the finely divided carbon soot particles so as to form a mixture of particulate carbon and water. The particulate carbon produced in synthesis gas manufacture is unique, and problems associated with the separation of synthesis gas carbon are not the same as those encountered in the removal of carbon or solids made by other processes. For example, the fine carbon particles from partial oxidation are unusual in that typically particulate carbon produced by the synthesis-gas-generation process will settle in water to a concentration of only about 1.0 to 3.0 weight percent, whereas conventional carbon blacks may settle to concentrations of as much as 10 weight percent.

To produce synthesis gas economically, it is important to separate clarified water from the carbon-water mixture for reuse. However, the fine particle size of the carbon soot makes ordinary filtration methods difficult and makes gravity separation uneconomical because of excessive settling times i.e. about 1–2 days. Further, liquid hydrocarbon extraction procedures for recovering particulate-carbon soot are complex. In a prior process by R. M. Dille et al., U.S. Pat. No. 3,147,093, a hydrocarbon oil was added to the water-carbon mixture to facilitate separation, but this procedure resulted in the formation of soft aggregates of carbon curds contaminated with oil. Further, under some conditions troublesome emulsions which are difficult to separate may form in the resulting oil-carbon-water dispersion. By the process of our invention, particulate carbon mixed with the organic extractant is quickly and easily separated from quench and scrubbing water, so as to permit recycle of the clarified water.

The oxo process is the commercial application of a chemical reaction called oxonation or, more properly, hydroformylation. In this reaction, hydrogen and carbon monoxide are added across an olefinic bond to produce aldehydes containing one more carbon atom than the olefin.

The oxyl process is a method for directly producing alcohols by catalytically reducing carbon monoxide with hydrogen so as to link several partially reduced carbon atoms together. Essentially it is a modified Fischer-Tropsch Process which preferentially produces oxygenated compounds consisting mainly of alcohols.

SUMMARY

The subject process relates to the recovery of particulate carbon from the effluent stream of synthesis gas i.e. mixtures of $H_2$ +CO, produced by the partial oxidation of a hydrocarbonaceous feedstock in a synthesis-gas generator at a temperature in the range of about 1300° to 3500° F and a pressure in the range of 1–300 atmospheres. The effluent gas stream from the gas generator is scrubbed with water in a scrubbing zone to produce a carbon-water dispersion. Then in a mixing zone a liquid organic extractant comprising a mixture of the liquid organic by-products from the oxo or oxyl process preferably containing a minimum of water-soluble components is mixed with the carbon-water dispersion in an amount sufficient to render all of the carbon particles in said dispersion hydrophobic and to resolve said carbon-water dispersion. Next in a separating zone, such as a decanter, a stream of clarified water and a dispersion of particulate carbon in said extractant, which dispersion floats on said clarified water layer, are separately removed. In another embodiment, the liquid organic extractant is added in two stages.

The clarified water may be recycled to said scrubbing zone, preferably after at least a portion of any dissolved water-soluble constituents from said extractant are removed. The carbon-extractant dispersion may be introduced into the synthesis-gas generator as at least a portion of the feedstock. However, it may first be mixed with fresh hydrocarbonaceous feed and preheated or vaporized. Preferably, the synthesis gas is produced at the proper pressure and $H_2/CO$ mole ratio for direct feeding into said oxo or oxyl process in which said mixture of liquid organic by-products is produced for use as said extractant.

Optionally, by an additional step the carbon-extractant dispersion may be concentrated in a centrifuge prior to being introduced into the gas generator as at least a portion of the feed. The comparatively clear thin stream from the centrifuge is then mixed with the carbon-water dispersion as at least a portion of said liquid organic extractant.

DESCRIPTION OF THE INVENTION

Synthesis gas comprises principally $H_2$ and CO and may contain relatively small amounts of $CO_2$, $H_2O$, $CH_4$, $H_2S$, $N_2$, COS, A, particlate carbon and fuel ash. It may be made by partial oxidation of a hydrocarbonaceous fuel feedstock in a free-flow synthesis gas generator. For example a liquid hydrocarbon fuel, such as fuel oil, is reacted with a free-oxygen-containing gas and stream at an autogenously maintained temperature within the range of about 1300° to 3500° F and at a pressure in the range of 1 to 300 atmospheres.

By scrubbing the effluent gas stream from the gas generator with water in a gas-scrubbing zone, particulate carbon may be removal from the gas stream as a pumpable or free-flowing carbon-water dispersion containing about 0.2 to 3 weight percent carbon. This carbon-water dispersion is then mixed with a liquid organic extractant in a mixing zone. The extractant comprises a mixture of liquid organic by-products from an oxo or oxyl process to be more fully described.

The amount of extractant is sufficient to render all of the carbon particles in the carbon-water dispersion hydrophobic and to resolve the carbon-water dispersion. As further described below, the extractant may be added in one or two stages. The total extractant forms with the carbon from the carbon-water dispersion a pumpable carbon-extractant dispersion containing about 0.5 to 5 wt. % carbon. A clarified water layer separates out in a decanter and sinks to the bottom.

The water layer is removed from the decanter and may be recycled to the scrubbing zone, preferably after purification by flashing to remove traces of hydrocarbons. The carbon-extractant dispersion which forms and floats on the water layer in the decanter may be removed and treated or utilized further or introduced into the gas generator as at least a portion of the fuel.

Gaseous inpurities in the effluent gas stream from the synthesis gas generator may be removed in a manner to be more fully described to produce synthesis gas e.g. mixtures of $H_2 + CO$ having a mole ratio $H_2/CO$ in the range of about 0.9 to 2.0 moles of $H_2$ per mole of CO. Synthesis gas may be produced having a specific $H_2/CO$ mole ratio for introduction into an oxo or oxyl process.

In one embodiment of the invention, the mixtures of carbon monoxide and hydrogen produced in the synthesis gas generator with a $H_2/CO$ mole ratio in the range of about 1–2 moles of the $H_2$ per mole of CO are used in the well known oxo process in which carbon monoxide and hydrogen are added to an olefin in the presence of a cobalt catalyst at e.g. a temperature in the range of about 100° to 200° C and a pressure in the range of about 65 to 300 atmospheres to produce an aldehyde containing one carbon atom more than the original olefin. Thus, a hydrogen atom and formyl group may be added across the double bond of an olefin as shown in equations (1) and (2)):

$$RCH = CH_2 + CO + H_2 \rightarrow RCH_2CH_2CHO \quad (1)$$
$$RCH = CH_2 + CO + H_2 \rightarrow RCH(CHO)CH_3 \quad (2)$$

Optionally, normal alcohols may be produced from the normal aldehydes by hydrogenation as shown in equation (3)

$$RCH_2CH_2CHO + H_2 \rightarrow RCH_2CH_2CH_2OH \quad (3)$$

The oxo reaction is homogeneously catalyzed by carbonyls of group VIII metals, iron, cobalt, nickel, ruthenium, rhodium, palladium, osmium, irridium, and platinum. However, cabalt is the only metal whose carbonyl catalysts are of industrial importance e.g. $CO_2(CO)_8$, $HCo(CO)_4$, and $Co_4(CO)_{12}$.

Reaction times vary in the range of about 5 to 60 minutes. The synthesis gas feed to the oxo or oxyl process contains 1–2 moles of hydrogen per mole of carbon monoxide.

Various olefinic raw materials include ethylene to produce propionaldehyde, propylene to produce butyraldehyde, and pentylenes, heptylenes, nonylenes, and dodecylenes used to produce higher oxo alcohols. Dimers and trimers of isobutylenes may be used. Straight chain products are favored over branched-chain products. For example, normal but not isobutyraldehyde can be converted into butanol or 2-ethyl-1-hexaol. Lower temperatures and higher carbon monoxide pressure favor the straight-chain isomers.

Processing steps required to produce an oxo product economically include (1) hydroformylation, or oxo reaction in an oxo reactor at a temperature in the range of about 100°–200° C and a pressure in the range of about 65–500 atm and preferably in the range of about 200 to 300 atm; (2) removal of catalyst from the reaction mixture (decobalting); (3) cobalt catalyst recovery and processing for reuse; (4) aldehyde product refining; and optionally, (5) hydrogenation at a temperature in the range of about 50°–250° C, and at a pressure in the range of about 50–3500 psi to produce alcohols; and (6) alcohol refining. Oxo products and by-products e.g. aldehydes, alcohols, are usually refined by conventional distillation equipment. Chemical treatment may be used to remove trace quantities of impurities.

The oxyl process as defined herein is a method for producing a mixture of oxygenated organic compounds by catalytically reducing carbon monoxide with hydrogen at a temperature in the range of about 175° to 450° C and a pressure in the range of about 10 to 200 atmospheres. The $H_2/CO$ ratio may be in the range of about 0.9 to 2 moles of $H_2$ per mole of CO. Space velocities may range from 100–500 SCF of dry feed per cu. ft. of cat. per hr., and higher, based on fresh food. Both fused and precipitated iron catalysts may be used. The iron catalyst may contain copper, calcium oxide, diatomite, and may be impregnated with potassium hydroxide. Iron nitride catalysts may be used.

The oxyl process for producing alcohols may be illustrated by Equation (IV);

$$2n\ H_2 + nCO \rightarrow C_nH_{2n+1}OH + (n-1)\ H_2O \quad (IV)$$

The alcohols may be subsequently converted to olefins and paraffins.

Essentially the oxyl process is a modified Fischer-Tropsch process which preferentially produces oxygenated compounds consisting mainly of alcohols. In addition to predominantly straight-chain alcohols and a few side-chain alcohols, by-product esters, other oxygen-containing compounds, paraffin hydrocarbons, and olefins may be produced. The olefins may be treated by the oxo process (hydroformylation followed by hydrogenation) to increase the yield of alcohols.

For example, a mixture of oxygenated compounds containing approximately 30% alcohols in addition to acids, aldehydes, olefins, and esters may be produced by converting gaseous mixtures of $H_2 + CO$ over alkalized iron fillings at 150 atmospheres pressure and at a temperature of 400°–450° C.

Another oxyl process operates at a pressure in the range of about 10 to 50 atmospheres and at a temperature of about 175°–230° C. Fused-iron catalysts, of the conventional ammonia-synthesis type, and high space velocities are used. Gas recycle to increase the catalyst life may be employed: 7–20 volumes of recycle gas per volume of fresh synthesis gas. Straight chain alcohols, e.g. up to $C_{12}$, may be produced by this process.

By-products as defined herein are normally liquid organic co-products formed in the hydroformylation or oxyl process and consist of liquid organic materials from the group consisting of alcohols, aldehydes, esters, ketones, ethers, acids, olefins, saturated hydrocarbons, and mixtures thereof.

A particular advantage of the subject invention is that the stream of synthesis gas may be produced in a synthesis gas generator at a proper pressure for direct use in the oxo or oxyl process, with gas purification but without gas compression. A costly gas compressor may thereby be eliminated. Also, the liquid by-products from the oxo or oxyl process, which may have previously presented a disposal problem may now be economically used as an extractant for resolving carbon-water dispersions produced in the synthesis gas scrubbing zone and as a generator feedstock.

The term liquid organic extractant as used herein by definition shall mean a mixture of liquid organic by-products from the oxo or oxyl process comprising at least one alcohol and at least one ester in admixture with at least one other constituent and preferably two or more ether constituents from the group listed in Table I. Also shown in Table I is the range of carbon numbers for the organic constituents. These organic compounds may have straight chains or branched structures. The specific composition of the liquid extractant will depend upon the reaction conditions, the type of reactants, and the procedure used to refine the product. The term liquid organic extractant includes whole samples and fractions thereof, and the raffinate after water extraction of said whole samples or fractions thereof. Preferably, the liquid organic extractant contains a minimum of water soluble compounds.

The amount of each constituent in the liquid organic extractant may be taken from the ranges shown in Table I. If a group of compounds is present, there may be more than one compound in that group present in the liquid organic extractant. For example, if the liquid organic extractant contains 65 wt. % of normal and isoalcohols and 18 wt. % of esters, then the total remaining constituents in the extractant cannot exceed 17 wt. %. The term by-products includes by definition the liquid organic waste products from the oxo or oxyl process, which have the composition shown in Tables I and II.

TABLE I

Ingredients in Liquid Organic "Extractant" From Liquid Organic By-Products of Oxo or Oxyl Process

| Group | Carbon Range | | | Wt. % | | |
|---|---|---|---|---|---|---|
| Alcohols | $C_3$ | to | $C_{16}$ | 2 | to | 75 |
| Esters | $C_6$ | to | $C_{28}$ | 5 | to | 70 |
| Aldehydes | $C_3$ | to | $C_{16}$ | Nil | to | 25 |
| Ketones | $C_3$ | to | $C_{16}$ | Nil | to | 25 |
| Ethers | $C_6$ | to | $C_{28}$ | Nil | to | 50 |
| Acids | $C_3$ | to | $C_{16}$ | Nil | to | 10 |
| Olefin | $C_5$ | to | $C_{15}$ | Nil | to | 30 |
| Saturated Hydrocarbons | $C_5$ | to | $C_{28}$ | Nil | to | 50 |
| Water | | | | Nil | to | 15 |

The range of ultimate analyses of liquid organic extractants derived from liquid organic by-products of the oxo or oxyl process is shown in Table II. The elements will lie within the approximate ranges shown, so long as the total wt. % is 100.

TABLE II

Ultimate Analysis of Liquid Organic Extractant Derived From Liquid Organic By-Products of Oxo or Oxyl Process

| | Wt. % |
|---|---|
| Carbon | About 55 to 90 |
| Hydrogen | About 5 to 17 |
| Oxygen | About 3 to 40 |

The preferred maximum concentration of organic acid present in the extractant is less than 5 wt. %, for example 1–2 wt. %. The organic esters are the reaction products of primary saturated alcohols and low-molecular-weight saturated organic acids.

The composition of a typical mixture of liquid organic by-products of an oxo process for the production of butyraldehyde as produced for example by the process shown in Hydrocarbon Processing, page 211, November 1969, Gulf Publishing Co., Houston, Texas is shown in Table III.

TABLE III

Composition of Typical Mixture of Liquid Organic By-Products From An Oxo Process

| | Wt. % |
|---|---|
| Esters | 54 |
| Ethers | 20 |
| Aldehydes | 5 |
| Ketones | 5 |
| Acids | About 5 and below |
| Olefins | About 1 and below |
| Saturated hydrocarbons | About 1 and below |
| n-butyl alcohol | 3.4 |
| i-butyl alcohol | 0.6 |
| Alcohol ($C_5$–$C_8$) | 3.0 |
| Water | 2 |

The esters in the aforesaid typical mixture have an average carbon number of 12 and may be formed by the reaction of $C_4$ to $C_9$ alcohols and $C_3$ to $C_8$ acids. The ethers are highly branched and have an average $C_{12}$ number. The ketones have an average $C_{12}$ number, and the acids have a $C_1$-$C_5$ number. The ultimate analysis of said typical mixture in wt. % is shown in Table IV.

TABLE IV

Ultimate Analysis of Typical Mixture of Liquid Organic By-Products From An Oxo Process

| | Wt. % |
|---|---|
| Carbon | 69.2 |
| Hydrogen | 12.0 |
| Oxygen | 18.8 |

Other properties of said typical mixture are shown in Table V.

TABLE V

Properties Of Typical Mixture of Liquid Organic By-Products From An Oxo Process

Gravity ° API 29.2
Density, 0.87
Viscosity, Centistokes 68° F. 4.1; 122° F 2.0
Distillation, ASTM

| Vol. % | ° F. | Vol. % | ° F. |
|---|---|---|---|
| IBP | 290 | 60 | 422 |
| 10 | 326 | 70 | 450 |
| 20 | 344 | 80 | 484 |
| 30 | 360 | 90 | 526 |
| 40 | 376 | 95 | 532 |
| 50 | 396 | EP | 564 |

It has been found that improved results can be obtained by using as the liquid organic extractant only a light fraction of the typical mixture described in Table III. Said typical mixture was derived from the aforesaid oxo process and was then fractionated in a Hempel Flask and Fractionating Column per ASTM Test Method D285–62. A cut comprising up to 60 volume %, for example the cut comprising up to 25% by volume, and preferably the cut comprising up to 10% by volume will give good and sharp separations of the extractant soot mixture from water. The preferred 10% by volume fraction has an initial atmospheric boiling point (i.b.p.) of about 192° F and the 10 volume % boiling point of about 300° F. ASTM-D285–62. The composition of this i.b.p. - 300° F. mixture is shown in Table VI.

TABLE VI

Composition of I.B.P. - 300° F. Mixture of
Liquid Organic By-Products From An Oxo Process

|  | Wt. % |
|---|---|
| n-Butanol | 47.9 |
| Isobutanol | 10.9 |
| Ispropanol | 0.2 |
| Isopentanol | 1.0 |
| Isohexanol | 1.0 |
| Ketones, $C_3$–$C_5$ | 2.0 |
| Esters, $C_6$–$C_8$ | 18.0 |
| Acids, $C_3$–$C_5$ | 5.0 |
| Water | 14.0 |

Said i.b.p. - 300° F mixture in Table VI has a gravity °API of about 35 and an ultimate analysis as shown in Table VII.

TABLE VII

Ultimate Analysis of i.b.p. - 300° F. Mixture of
Liquid Organic By-Products From Oxo Process

|  | Wt. % |
|---|---|
| Carbon | 62.2 |
| Hydrogen | 11.1 |
| Oxygen | 26.7 |

There are preferably none of the following materials in the extractant: salts, sulfuric esters (sulfates), alkane or alkyl sulfonic acids, amine, amino, and ammonium compounds.

Preferably, by conventional methods e.g. flashing, extraction, distillation, and decanting, the water and water-soluble constituents are removed from said liquid organic extractants prior to mixing the extractant with the carbon-water dispersion.

The synthesis gas generator in my process preferably consists of a compact, unpacked, free-flow noncatalytic, refractory-lined, steel, pressure vessel of the type d described in coassigned U.S. Pat. No. 2,809,104 issued to D. M. Strasser et al., which patent is incorporated herewith by reference.

The free-oxygen-containing gas may be selected from the group consisting of air, oxygen-enriched air (22 mole percent $O_2$ and higher), and preferably substantially pure oxygen (95 mole percent $O_2$ and higher).

Preheating of the reactants is optional but generally desirable. For example, a hydrocarbon oil and steam may be preheated to a temperature in the range of about 100° to 800° F. and the oxygen may be preheated to a temperature in the range of about 100° to 1000° F.

A wide variety of hydrocarbonaceous fuels is suitable as feedstock for the partial oxidation process, either alone, in combination with each other or with particulate carbon, and preferably in combination with said carbon-liquid organic extractant dispersion. For example, from 1 to 90 parts by weight of carbon-extractant dispersion may be mixed with each part by weight of the hydrocarbonaceous feed or mixtures thereof. The hydrocarbonaceous feeds include fossil fuels such as various petroleum distillates and residues, naphtha, gas oil, residual fuel, reduced crude, fuel oil, whole crude, coal-tar oil, shale oil, and tarsand oil. Slurries of solid carbonaceous fuels, i.e., lignite, bituminous and anthracite coals, and particulate carbon in water or liquid hydrocarbons are also suitable and are included herewith as within the scope of the definition for hydrocarbonaceous fuel feeds.

It is normal to produce from hydrocarbonaceous fuel feeds by partial oxidation about 0.5 to 20 weight percent of free-carbon soot (on the basis of carbon in the hydrocarbonaceous fuel feed). The free-carbon soot is produced in the reaction zone of the gas generator for example, by cracking hydrocarbonaceous fuel feeds. Carbon soot will prevent damage to the refractory lining in the generator by constituents which are present as ash components in residual oils. With heavy crude or fuel oils, it is preferable to leave about 1 to 3 weight percent of the carbon in the feed as free-carbon soot in the product gas. With lighter distillate oils, progressively lower carbon-soot yields are maintained.

The amount of soot in the product synthesis gas may be controlled primarily by regulating the oxygen-to carbon ratio (O/C, atom/atom) in the range of 0.7 to 1.5 atoms of oxygen per atom of carbon in the feed and, to some extent, by regulating the weight ratio of $H_2O$ to hydrocarbonaceous fuel feed in the range of 0.15 to 3.0 pounds of $H_2O$ per pound of hydrocarbonaceous fuel feed.

In the above relationship, the O/C ratio is to be based upon (1) the type of free-oxygen atoms in the oxidant stream plus combined oxygen atoms in the hydrocarbonaceous fuel feed molecules and (2) the total of carbon atoms in in the hydrocarbonaceous fuel feed plus carbon atoms in recycled soot. Since the oxo and oxyl by-products contain combined oxygen atoms, the requirement of free oxygen for gasification is less than for ordinary hydrocarbon. In fact, there is a synergistic effect leading to even lower oxygen consumption than would be expected according to direct proportionality.

$H_2O$ is principally introduced into the reaction zone to help control the reaction temperature, to act as a dispersant of the hydrocarbonaceous fuel fed to the reaction zone, and to serve as a reactant to increase the relative amount of hydrogen produced. Other temperature moderators include $CO_2$-rich gas, a cooled portion of product gas cooled off-gas from an integrated ore-reduction zone, nitrogen, and mixtures thereof.

Many advantages are achieved in the subject process by the addition of oxygen containing hydrocarbon materials, such as found in the liquid organic extractant, as a portion of the feed to the synthesis gas generator. For example, for a given level of soot production, the amount of free oxygen supplied to the reaction zone of the snythesis gas generator, and the stream to fuel weight ratio may be decreased at a substantial cost savings.

The free-carbon soot leaving the reaction zone entrained in the stream of product synthesis gas has some unique properties. It is both hydrophilic and oleophilic. It is easily dispersed in water and has a high surface area. For example, the specific surface area of the free-carbon soot, as determined by nitrogen absorption, ranges from 100 to 1,200 square meters per gram. The Oil Absorption Number, which is a measurement of the amount of linseed oil required to wet a given weight of carbon soot, ranges from 1.5 to 5 cc's of oil per gram of carbon soot. For further information regarding the test method of determining the Oil Absorption Number see ASTM Method D-281.

Free-carbon soot, also referred to herein as particulate carbon, as produced within our process has a particle size in the range of about 0.01 to 0.5 microns and commonly has a diameter of about 77 millimicrons. Free-carbon soot comprises about 92 to 94 weight percent of carbon, 1 to 4 weight percent of sulfur, and 3 to 5 weight percent of ash. Being formed at high temperatures, it is substantially free from volatile matter.

In one embodiment of our invention, the hot gaseous effluent from the reaction zone of the synthesis gas generator may be quickly cooled below the reaction temperature to a temperature in the range of 180° to 700° F. by direct quenching in water in a gas-liquid contacting or quenching zone.

For example, the cooling water may be contained in a carbon-steel quench vessel or chamber located immediately downstream from the reaction zone of said gas generator. A large-diameter dip leg starting at the bottom end of the reaction zone and discharging beneath the water level in the quench chamber serves as an interconnecting passage between the reaction zone and the quench zone, through which the hot product gases pass. This passage also serves substantially to equalize the pressure in the two zones. A concentric draft tube, open on both ends, surrounds said dip leg, creating an annulus through which a mixture of quenched gas and water rises vigorously and splashes against the support plate of the reactor floor. The water and gas then separate in the quench chamber in the space outside the draft tube. This circulation of water through the draft-tube system maintains the entire quench system at essentially the temperature of the water leaving the quench vessel, which is also the temperature of the saturated steam in the quench zone.

Recycle water from the carbon-scrubbing zone, to be further described, is normally introduced through a quench ring at the top of the dip-leg to cool the metal at that point. Large quantities of steam are generated in the quench vessel, and the quench chamber may be likened to a high-output high-pressure boiler.

The turbulent condition in the quench chamber, caused by the large volume of gases bubbling up through said annular space, helps the water to scrub a large part of the solids from the effluent gas so as to form a dispersion of uncovered particulate carbon and quench water. Further, steam requried for any subsequent shift conversion step is picked up by the effluent synthesis gas during quenching. For a detailed description of the quench chamber, reference is made to coassigned U.S. Pat. No. 2,896,927 issued to R. E. Nagle et. al., which is herewith incorporated by reference. Any residual solids in the cooled and scrubbed effluent synthesis gas leaving the quench chamber may be removed by means of a conventional venturi or jet scrubber, such as described in Perry's Chemical Engineers' Handbook, Fourth Edition, McGraw-Hill Co., 1963, pages 18–55 to 56.

Alternately, the hot effluent gas stream from the reaction zone of the synthesis-gas generator may be cooled to a temperature in the range of about 240° to 700° F. by indirect heat exchange in a waste-heat boiler. The entrained solid particles may be then scrubbed from the effluent synthesis gas by contacting and further cooling the effluent stream of synthesis gas with quench water in a gas-liquid contact apparatus, for example, a quench dip-leg assembly, a spray tower, venturi, or jet scrubber, bubble-plate contactor, packed column, or in a combination of said equipment. For a detailed description of cooling synthesis gas by means of a waste-heat boiler and a scrubbing tower, reference is made to coassigned U.S. Pat. No. 2,999,741 issued to R. M. Dille et al. and incorporated herewith by reference.

It is desirable to maintain the concentration of particulate carbon in the gas-cooling and scrubbing-water streams in the range of about 0.5 – 3 wt. % and preferably below about 1.5 wt. %. In this manner, the dispersion of carbon in water will be maintained sufficiently fluid for easy pumping through pipelines and for further processing.

The temperature in the scrubbing zone is in the range of about 180° to 700° F., and preferably in the range of about 250° – 550° F. The pressure in the scrubbing zone is in the range of about 1–250 atmospheres, and preferably at least 25 atmospheres. Suitably the pressure in the scrubbing zone is about the same as that in the gas generator, less ordinary pressure drop in the lines.

It is important with respect to the economics of the process that the particulate carbon be removed from the carbon-water dispersion and the resulting clear water be recycled and reused for cooling and scrubbing additional particulate carbon from the synthesis gas.

In the subject continuous process the previously described liquid organic extractant comprising a mixture of liquid organic by-products from the oxo or oxyl process is used to resolve the carbon-water dispersion so as to separate the water from the carbon in single stage extraction. The total amount by weight of said liquid organic extractant that is mixed with said carbon-water dispersion is in the range of about 10 to 200 times, and preferably in the range of about 20–100 times the weight of the particulate carbon in the carbon-water dispersion. This amount is sufficient to render all of said particulate carbon hydrophobic and to resolve the carbon-water dispersion. Clarified water separates from the carbon-water dispersion and a carbon-extractant dispersion is produced.

The carbon-water dispersion may be contacted with said liquid extractant by any suitable means e.g. mixing valve, static mixer, baffled mixer, pump, orifice, nozzle, propeller mixer, or turbine mixer. High pressure will make possible the use of an extractant containing lower-boiling constituents. High temperature facilitates phase separation.

The mixed steam is passed into a phase-separation zone, for example a decanter or tank providing a relatively quiescent settling zone. In the separating zone, also known as a decanter clarified water sinks to the bottom by gravity. A dispersion of carbon in said extractant may float on top of the clarified water. The volume of the settling tank should be sufficient to provide a suitable residence time preferably of at least two minutes and usually in the range of about 5 to 15 minutes.

The pressure in the settling zone or decanter should be sufficient to maintain both the extractant and the water in liquid phase, e.g. 5 to 250 atmospheres, depending upon the temperature. The temperature, in the decanter will be substantially that of the carbon-water dispersion leaving the scrubbing zone e.g. 180°–700° F., and preferably in the range of about 250°–550° F.

Clarified water is removed from the decanter, and at least a portion in admixture with fresh water may be recycled to the scrubbing zone. Optionally, at least a portion of any dissolved water-soluble constituents from the extractant may be removed from the clarified water by conventional means before the water is recycled to the scrubbing zone. For example, the clarified water stream may be introduced into a gas-liquid separation zone where the pressure is suddenly dropped. A light gaseous fraction is flashed off which is cooled below the dew point to separate uncondensed light gases, water, and water soluble oxygen containing liquid organic compounds. A pumpable dispersion of particulate carbon in extractant containing about 0.5 to 5 wt. % solids, and preferably about 1.0 to 3 wt. % may be introduced into the synthesis-gas generator as at least a portion of the hydrocarbonaceous feed.

Optionally, said particulate carbon-extractant dispersion may be preheated to a temperature in the range of about 200° to 800° F. or vaporized prior to being introduced into the gas generator. Optionally, about 0.01 to 99 parts by weight of said carbon-extractant dispersion may be admixed with each part by weight of fresh hydrocarbonaceous fuel feed, e.g. heavy fuel oil, before being introduced into the gas generator in a liquid or vapor phase. Alternatively the carbon-extractant dispersion and oil mixtures may be burned as fuel in a furnace. In a separate embodiment to be further described, the aforesaid decanter is combined with a centrifugal separator that further concentrates the carbon-extractant dispersion.

Another embodiment of the invention involves two simultaneous additions of liquid organic extractant in two continuous stages. Thus in the first stage, the aforesaid carbon-water dispersion is resolved into a clarified water layer and a dry carbon powder which floats on the clarified water. This may be accomplished by adding the liquid organic extractant to the carbon-water dispersion in an amount just sufficient to render all of the carbon hydrophobic but insufficient to produce a carbon-extractant dispersion at this stage. As a result of this smaller amount of extractant, the carbon separates rapidly and substantially completely from the water and floats to the surface of the clarified-water layer as a dry-appearing, particularly agglomerated spot.

The amount of liquid organic extractant to be added may be obtained experimentally by shake tests. Small increments of extractant are added to the carbon-water dispersion until the carbon separates rapidly and floats on the surface of the clarified water. Thus when the water phase is clear and the carbon is "dry" and fluffy, the amount of extractant is optimum. The amount of liquid organic extractant added in the first stage will usually fall within the range of about 1-3 times the Oil Absorption No. of the particulate carbon in the carbon-water dispersion. This amount may range between about 1.5 and 10 lbs. of extractant per lb. of carbon or preferably in the range of about 3 to below 6.

In the second stage the particulate carbon is floated off the surface of the clarified water layer in the decanter by introducing a horizontal stream of additional liquid organic extractant into said decanter at or near the interface between said clarified-water layer and said particulate carbon.

A sweeping action across the interface will also disperse the carbon in the extractant. The extractant in the first and second stages may have the same or different constituents. However any extractant used conforms to those previously described — see Tables I and II.

The principal advantage of the two-stage addition lies in the avoidance of the formation of emulsions. In the first stage, the carbon-water dispersion is resolved, and the carbon floats to the surface of the water with the addition of a minimum of extractant. The secondary liquid organic extractant is then added in much larger amounts with a minimum of mixing with the water so that emulsion formation is avoided even if emulsifying agents are present.

The amount of liquid extractant that is introduced in the second stage is sufficient to form a carbon-extractant dispersion containing about 0.5 to 5 wt. % carbon in the total extractant. This amount may be about ten times the amount of extractant that was used in the first stage. The clarified water is removed from the decanter in the manner described previously.

In another embodiment of the process, a clarified or "thin" centrifuge stream, to be further described, may be used as at least a portion of the liquid organic extractant in the single-stage operation of the decanter. Alternatively, said clarified thin centrifuge stream may be used as the liquid organic extractant in extraction and decantation, as at least a portion of the liquid organic extractant in either said single-stage extraction or in the first, second, or both stages of a two-stage extraction.

In the centrifugal-separation zone, the carbon-extractant dispersion may be separated into a "thick" centrifuge stream and a comparatively clean "thin" centrifuge stream of carbon-extractant. The thick centrifuge stream may have a carbon content in the range of about 1 to 10 wt. % and suitably about 4 to 7 weight percent. The thin centrifuge stream may have a carbon content in the range of about 0.02 to 1 wt. %, and suitably about 0.1 to 0.5. The thick centrifuge steam of carbon-extractant may be then passed into the synthesis-gas generator as at least a portion of the hydrocarbonaceous feed. Optionally, from about 0.01 to 99 parts by wt. thickened centrifuge stream may be mixed with each part by wt. fresh hydrocarbonaceous fuel and fed to the synthesis-gas generator. Optionally, these fuel streams may be used as fuel in a furnace. Further, these mixtures of hydrocarbonaceous fuel and carbon-extractant streams may be preheated to a temperature in the range of about 100° to 800° F. They may be introduced into the gas generator in liquid phase or vapor phase and may be in admixture with $H_2O$.

The comparatively clean thin centrifuge stream of carbon-extractant is passed into a hold-up tank where any waste gas is removed. At least a portion of the clarified thin centrifuge stream may be then recycled to the extraction step. Clean water is removed from the bottom of the decanter and recycled to the carbon-scrubbing zone. Preferably, at least a portion of the water-soluble constituents of the extractant may be removed from the water.

The pressure in the centrifuge may be in the range of about 1 to 200 atmospheres. Centrifuges are normally constructed for operation at atmospheric pressure, but it would be advantageous to carry out the centrifuging at a pressure only slightly below the decanter pressure, which is usually substantially lower than that of the synthesis-gas generator. The temperature in the centrifuge may be in the range of about ambient to 700° F.

Industrial centrifuges, such as described in Perry's Chemical Engineers' Handbook by Perry, Chilton, and Kirkpatrick, Fourth Edition, McGraw-Hill, Pages 19–86 to 19–100, employ centrifugal acceleration which is many times gravitational acceleration. The centrifugal force causes sedimentation of solid particles through a layer of liquid or the filtration of a liquid through a bed of porous solids. Centrifugal force, commonly expressed in multiples of the standard force of gravity, varies with the rotational speed and with the radial distance from the center of the rotating bowl.

Continuous disc centrifuges are suitable for use in the subject process.

Disc centrifuges, for example illustrated in FIG. 19–139 of Perry's Chemical Engineers' Handbook, develop 4,000 to 10,000 times the force of gravity, and may go up to 20,000. Disc centrifuges have a bowl diameter in the range of about 7 to 32, a disc spacing in the range of about 0.015 to 0.50 inches, number of discs in the range of about 30 to 130, and a disc half-angle in the range of about 35 to 50.

Although the process of the invention is particularly suitable for removing substantially all of the dispersed particulate carbon from a carbon-water dispersion produced by water scrubbing the effluent gaseous stream from the partial oxidation process, it may be similarly used in many other hydrocarbon gasification processes.

DESCRIPTION OF THE DRAWING AND EXAMPLES

A more complete understanding of the invention may be had by reference to the accompanying schematic drawing which shows in FIG. 1 the previously described process in detail. Quantities have been assigned to the various streams on an hourly basis so that the following description in Example 1 may also serve as an example of the subject continuous process.

EXAMPLE I

With reference to FIG. 1 of the drawing, on an hourly basis about 14,400 lbs. of a particulate carbon-water dispersion at a temperature of about 250° F. and containing about 144 lbs. of carbon from the previously described gas-scrubbing zone of a process for making synthesis gas by the partial oxidation of a hydrocarbonaceous fuel to be further described are passed through line 1 into mixer valve 2, in which said carbon-water dispersion is mixed with 9216 lbs. of a liquid organic extractant from lines 3, 40, valve 41, and line 42. Valve 36 is closed.

The aforesaid synthesis gas is produced at a temperature of about 2400° F. and a pressure of about 30 atm. in a free-flow partial-oxidation gas generator (not shown). The composition of the synthesis gas in mole % follows: CO 41.00, $H_2$ 42.22, $CO_2$ 4.39, $H_2O$ 11.26, $CH_4$ 0.21, A 0.11, N 0.12, and $H_2S$+COS 0.69. About 144 lbs. of soot (particulate carbon plus ash) are entrained in the generator-effluent gas.

About 9,966 pounds of hydrocarbonaceous charge stock are introduced into the partial-oxidation synthesis-gas generator. This feedstream consists of 82% heavy fuel oil plus 18% of a liquid extractant comprising mixtures of by-products from an oxo process to be further described. The ultimate analysis of the mixture of by-products and heavy fuel oil in wt. % follows: carbon 81.22, hydrogen 11.37, nitrogen 0.48, sulfur 3.28, oxygen 3.45, ash 0.20. The gross heating value is about 17,814 BTU per pound and the gravity is 19.6° API. 144 lbs. of unreacted carbon plus ash are recovered by the subject process and are fed to the generator as a portion of the feed. 4,395 lbs. of steam and 10,183 lbs. of pure oxygen, contained in a stream of 99.5 mole percent purity, are also charged to the generator.

After purification and drying to remove acid gases, $H_2O$, and particulate carbon, the synthesis gas is compressed and introduced into an oxo process for the production of, for example, n-butyraldehyde by the hydroformylation of proplyene in the presence of a cobalt catalyst at a temperature in the range of about 130° – 175° C and a pressure of about 200 atm.

The liquid organic extractant in line 3 comprises a mixture of liquid organic by-products from said oxo process having the composition shown in Table III and the Ultimate Analysis shown in Table IV in the specification with substantially all of the water soluble compounds removed.

The mixture of said liquid organic extractant and carbon-water is passed through line 5 into decanter 6. A relatively quiescent volume is provided in the settling zone at a pressure of about 25 atm. Substantially clear water, containing any dissolved water-soluble ingredients from said extractant settles by gravity to the bottom of decanter 6 and flows out by way of line 7. Preferably, the water in line 7 may be purified by suitable means and then recycled to the gas-cooling and scrubbing zone. A portion may be discharged from the system and replaced by fresh water.

About 9,360 lbs. of a dispersion of particulate carbon and said liquid organic extractant, containing about 144 lbs. of carbon are removed near the top of decanter 6 by way of line 8. About 2,822 lbs. of this carbon-extractant-water dispersion are passed through line 9 and line 10 and into holding tank 11. Optionally, about 8,172 lbs. of fresh heavy liquid hydrocarbon fuel oil may be introduced into the system by way of line 12, valve 13, and line 14 and mixed with the carbon-extractant dispersion in line 10. By means of pump 15, a carbon-extractant-oil mixture may be pumped from line 16 through lines 17, 18, and valve 19 and line 20 into the reaction zone of said partial-oxidation gas generator (not shown) as said hydrocarbonaceous feed. Optionally, a portion of the carbon-extractant-oil mixture in line 16 may be passed through lines 17 and 25, valve 26, and line 27 into a furnace (not shown) as fuel. Similarly, about 7,422 lbs. of the extractant from line 8 are passed through line 30, valve 31 and line 32 and car be utilized in a furnace as fuel. It is usually desirable to operate the decanter at a pressure substantially below that of the gas generator.

In the aforesaid example all of the liquid organic by-products from an oxo or oxyl process were mixed with the carbon-water dispersion in mixing zone 2 in one stage. In another embodiment of the subject process, addition of the liquid extractant may be done in two-stages. For example, with both valve 36 and valve 41 open, 432 lbs. of fresh liquid organic extractant from lines 40, and 42 are introduced in the first stage into mixer 2 and mixed with the carbon-water dispersion from line 1. Simultaneously, in the second stage, still with both valve 36 and valve 41 open, about 8,784 lbs. of additional liquid organic extractant are passed through lines 35 and 37 into decanter 6 to sweep or float off the particulate carbon floating on the water surface. The rest of the process is substantially the same as previously described. Two-stage decanter operation will be described further in Example II.

EXAMPLE II

Figure 2:
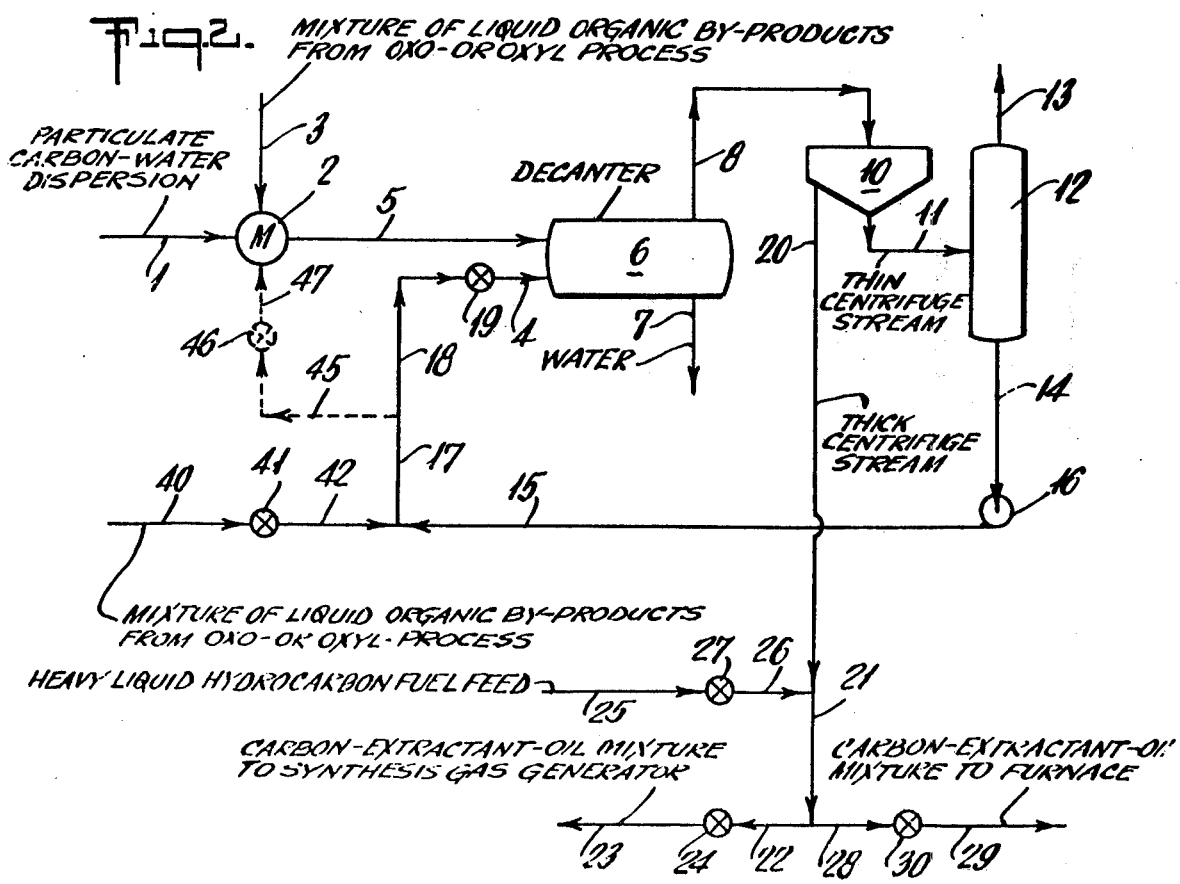

This example illustrates that embodiment where two separate and simultaneous additions of liquid organic extractant of the type described in Example I are made and are followed by centrifugal separation of the carbon-extractant overhead from the decanter. All quantities are on an hourly basis. This continuous process is shown in FIG. 2.

Example II is similar to the process in Example I, but provides for the two-stage addition of extractant. In the first stage, 432 lbs. of fresh liquid organic extractant from line 3 are mixed in mixer 2 with 14,400 lbs. of carbon-water dispersion, from line 1, containing about 144 lbs. of carbon; and the mixture is introduced into decanter 6 in the manner described previously in Example I. However the amount of liquid organic extractant added in the first stage is sufficient only to render all of the carbon in the dispersion hydrophobic. The carbon rises to the top of the decanter and floats on the clarified-water layer as a dry powder. The decanter is at a pressure of about 25 atm. Simultaneously in the second stage there is introduced into decanter 6 through line 5 about 10,554 lbs. of additional liquid organic extractant, comprising a clarified thin centrifuge stream produced subsequently in the process and substantially comprising said liquid organic extractant plus any make-up liquid organic extractant. This second stream of extractant is introduced into the decanter near or at the interface between the carbon and the surface of the clarified-water layer. By this means the particulate carbon may be floated off the surface of the clarified-water layer in the decanter. A carbon-extractant dispersion is thereby produced, which is removed from decanter 6 by way of line 8 and passed into centrifugal separation zone 10.

Substantially clear water, containing any dissolved water-soluble constituents of said extractant, settles by gravity to the bottom of decanter 5 and is removed by way of line 7. Preferably, the water in line 7 may be purified by suitable means to remove the dissolved water-soluble constituents from the extractant and then recycled to the synthesis-gas-cooling and scrubbing zone. A portion of this water may be discharged from the system. About 11,130 lbs. of carbon-extractant dispersion from line 8, containing at least 144 lbs. of carbon together with entrained water, are charged into a conventional continuous centrifuge 10. The centrifuging speed is about 9500 revolutions per minute.

About 9,192 lbs. of a partially clarified thin stream of extractant are removed from centrifuge 10 by way of line 11 and are introduced into holding tank 12. Waste gas is discharged from the system through line 13 and sent to flare. Optionally, this gas may be cooled below the dew point to separate out water and any condensible organic liquids. A comparatively clean dispersion of particulate carbon and extractant is removed through line 14, pumped by pump 16 into decanter 6 through line 15, 17, 18, valve 19, and line 4. Optionally, additional liquid organic extractant as previously described may be introduced from an external source into the system through line 40, valve 41, and line 42. For example, liquid organic extractant from line 42 may be mixed in line 17 with the thin centrifuge stream from line 15 prior to being introduced into decanter 6 in the second stage. Alternatively, in the two-stage operation of the decanter, by manipulating valves 46 and 19 separate portions of the thin centrifuge stream 15 may be passed into the first-stage mixer by way of lines 15, 17, 45 and 47; or into decanter 6 in the second stage by way of lines 15, 17, 18, and 4; or into the mixer in the first stage and the decanter in the second stage.

About 2,224 lbs. of a thick centrifuge stream of particulate carbon mixed with extractant containing about 144 lbs. of particulate carbon, are removed from centrifuge 10 by way of line 20. Preferably, this stream with or without preheat may be introduced into the synthesis-gas generator (not shown) as a portion of the feed by way of lines 21-23 and valve 24. Optionally, heavy liquid-hydrocarbon fuel oil may be introduced into the system by way of lines 25-26 and valve 27 and mixed in line 21 with said thick centrifuge stream. For example, 8,172 lbs. of the heavy fuel described in Example I are mixed in line 21 with the thick centrifuge stream from line 20. Optionally, the thick centrifuge stream in line 20 may be passed through lines 21, 28-29, and valve 30 to be burned in a furnace, for example, to produce steam. Optionally, heavy liquid-hydrocarbon fuel oil from line 25 also may be mixed with this furnace fuel. The thick centrifuge stream in line 23 may be introduced into the gas generator in liquid or vapor phase. Preferably, it may be vaporized and dispersed in steam.

A variation in the aforesaid process may be the introduction of the required amount of liquid organic extractant into decanter 6 in a single stage. For example, with valve 19 closed and valve 46 open, the thin centrifuge stream from line 14 may be pumped into mixer 2 by way of lines 15, 17, 45, and 47. Any additional fresh liquid organic extractant required may be introduced through line 3 or 40 and passed into mixer 2.

Obviously, various modifications of the invention as herein before set forth may be made without departing from the spirit and scope thereof; and, therefore, only such limitations should be made as are indicated in the appended claims.

I claim:
1. A method for producing clean synthesis gas for the oxo or oxyl process comprising
   1. reacting by partial oxidation a hydrocarbonaceous fuel or a slurry of solid carbonaceous fuel with substantially pure oxygen in the reaction zone of a free-flow noncatalytic synthesis gas generator at a temperature in the range of about 1300° to 3500° F and a pressure in the range of about 1 to 300 atmospheres in the presence of a temperature moderator to produce an effluent gas stream comprising $H_2$ and CO and containing entrained particulate carbon and at least one member of the group $CO_2$, $H_2O$, $H_2S$, COS, $CH_4$, A, $N_2$, and mixtures thereof;
   2. introducing said effluent gas stream into gas cooling and gas scrubbing zones in which the gas stream is cooled and the entrained particulate carbon is removed, so as to produce a carbon-water dispersion;
   3. removing gaseous impurities from the gas stream leaving (2), so as to produce a stream of synthesis gas substantially comprising $H_2$ and CO;
   4. introducing the synthesis gas from (3) into an oxo or oxyl process for the production of liquid oxygen containing hydrocarbons, and separating therefrom a mixture of liquid organic by-products comprising at least one alcohol and at least one ester in admixture with at least one constituent from the group consisting of aldehydes, ketones, ethers, acids, olefins, saturated hydrocarbons, and water;
   5. contacting said carbon-water dispersion from (2) with a liquid organic extractant comprising the aforesaid mixture of liquid organic by-products from (4) in an amount sufficient to render all of the carbon particles in said carbon-water dispersion hydrophobic and to resolve said carbon-water dispersion; and
   6. by decanting, separately removing in a separating zone a stream of clarified water and a pumpable dispersion having a carbon content of about 0.5 to 5 weight % and comprising said carbon particles and said liquid organic extractant; and wherein said separating zone is at a temperature in the range of 180° to 700° F and a pressure sufficient to maintain both the extractant and water in liquid phase.

2. The process of claim 1 where said liquid organic extractant in step (5) is obtained by the fractional distillation of a mixture of liquid organic by-products from the oxo or oxyl process in step (4) and consists of the fraction up to 10 volume % and has approximately the following ultimate analysis in weight percent: carbon 62.2 hydrogen 11.1, and oxygen 26.7.

3. The process of claim 1 provided with the steps of mixing about 0.01 to 99.0 parts by weight of said dispersion comprising said carbon particles and said liquid organic extractant from step (4) with each part by weight of fresh hydrocarbonaceous fuel feed before being introduced into the gas generator.

4. The process of claim 1 wherein said liquid organic extractant comprises the following mixture:

| Group | Carbon Range | | | Wt. % | | |
|---|---|---|---|---|---|---|
| Alcohols | $C_3$ | to | $C_{16}$ | 2 | to | 75 |
| Esters | $C_6$ | to | $C_{28}$ | 5 | to | 70 |
| Aldehydes | $C_3$ | to | $C_{16}$ | Nil | to | 25 |
| Ketones | $C_3$ | to | $C_{16}$ | Nil | to | 25 |
| Ethers | $C_3$ | to | $C_{28}$ | Nil | to | 50 |
| Acids | $C_3$ | to | $C_{16}$ | Nil | to | 10 |
| Olefins | $C_5$ | to | $C_{15}$ | Nil | to | 30 |
| Saturated Hydrocarbons | $C_5$ | to | $C_{28}$ | Nil | to | 50 |
| Water | | | | Nil | to | 15. |

5. The process of claim 1 wherein said liquid organic extractant comprises the following mixture:

| | Wt. % |
|---|---|
| Esters | 54 |
| Ethers | 20 |
| Aldehydes | 5 |
| Ketones | 5 |
| Acids | About 5 and below |
| Olefins | About 1 and below |
| Saturated hydrocarbons | About 1 and below |
| n-butyl alcohol | 3.4 |
| i-butyl alcohol | 0.6 |
| Alcohol ($C_5$-$C_8$) | 3.0 |
| Water | 2 |

6. The process of claim 1 in which said hydrocarbonaceous fuel is selected from the group consisting of various petroleum distillates and residues, naphtha, gas oil, residual fuel, whole crude, fuel oil, reduced crude; coal tar oil; shale oil; and tar sand oil; and said slurry of solid carbonaceous fuel is selected from the group consisting of particulate carbon, lignite, bituminous and anthracite coal in water or liquid hydrocarbon.

7. A method for producing clean synthesis gas for the oxo or oxyl process comprising:

1. reacting by partial oxidation a hydrocarbonaceous fuel or a slurry of solid carbonaceous fuel with substantially pure oxygen gas in the reaction zone of a free-flow noncatalytic synthesis gas generator at a temperature in the range of about 1300° to 3500° F and at a pressure in the range of about 1 to 300 atmospheres in the presence of a temperature moderator to produce an effluent gas stream comprising $H_2$ and CO and containing entrained particulate carbon and at least one member of the group $CO_2$, $H_2O$, $H_2S$, COS, $CH_4$, A, and $N_2$;

2. introducing said effluent gas stream into gas cooling and gas scrubbing zones in which the gas stream is cooled and contacted with water so as to effect the removal of said particulate carbon from said effluent gas stream and to produce a carbon-water dispersion;

3. removing gaseous impurities from the gas stream leaving (2) so as to produce a stream of synthesis gas substantially comprising $H_2$ and CO and having a mole ratio of about 0.5–2.0 moles of $H_2$ per mole of CO;

4. introducing the synthesis gas from (3) into an oxo or oxyl process for the catalytic production of aldehydes or alcohols and separating therefrom a liquid organic extractant comprising a mixture of liquid organic by-products comprising at least one alcohol and at least one ester and at least one constituent from the group consisting of aldehydes, ketones, ethers, acids, olefins saturated hydrocarbons, and water;

5. contacting said carbon-water dispersion from (2) in two stages including in the first stage the step of mixing said carbon-water dispersion with about 1.5 to 10 lbs. of said extractant from step (4) per lb. of carbon so as to render all of said particulate carbon hydrophobic and to release dry powdered carbon from said carbon-water dispersion, with said carbon rising to the surface of said water in a separating zone; and in the second stage introducing a stream of said liquid organic extractant into said separating zone adjacent the water surface so as to float off said carbon from a bottom layer of said clarified water and to form a carbon-extractant dispersion containing about 0.5 to 5 weight percent carbon.

8. The process of claim 7 in which the amount of said liquid organic extractant mixed with the carbon-water dispersion in the first stage on a weight basis is about 1 to 3 times the Oil Absorption Number of the particulate carbon as determined by ASTM D281–31.

9. The process of claim 7 in which said liquid organic extractant from step (4) is subjected to fractional distillation and the fraction up to 25 volume percent is used as the liquid organic extractant in step (5).

10. The process of claim 9 in which said liquid organic extractant is the fraction in the range of up to 10 volume % and has a boiling point in the range of about i.b.p. to 300° F.

11. The process of claim 7 provided with the additional steps of withdrawing clarified water from the separating zone in step (5), removing at least a portion of the dissolved water soluble constituents from said clarified water, and recycling said purified water to the gas scrubbing zone in step (2) as said water.

12. The process of claim 7 provided with the additional step of introducing at least a portion of the carbon-extractant dispersion from step (5) into the synthesis gas generator of step (1) as at least a portion of the feed.

13. The process of claim 7 with the added steps of introducing said carbon-extractant dispersion from step (5) into a centrifuging zone at a temperature in the range of about ambient to 700° F and a pressure in the range of about 1 to 200 atmospheres, separately withdrawing from said centrifuging zone a thick centrifuge stream of carbon-extractant and a thine centrifuge steam of carbon-extractant; introducing said thick centrifuge stream into said gas generator as at least a portion of said hydrocarbonaceous fuel; degasifying said thin stream and introducing at least a portion of said stream into said separation zone in either said first, second or both stages as said stream of liquid organic extractant; withdrawing said clarified water stream from said separating zone and removing from said water at least a portion of the dissolved water soluble constituents from said extractant; and recycling said purified water to said gas-scrubbing zone to scrub carbon from the effluent gas stream leaving the gas generator.

14. The process of claim 13 provided with the steps of mixing about 0.01 to 99 parts by weight of said thick centrifuge stream with each part by weight of fresh hydrocarbonaceous fuel and introducing said mixture into said synthesis gas generator as feedstock.

15. The process of claim 7 wherein the liquid organic extractant from step (4) contains substantially no water soluble compounds.

16. The process of claim 7 provided with the additional step of introducing at least a portion of the carbon-extractant dispersion from step (5), optionally in admixture with liquid hydrocarbon fuel into a furnace as fuel.

17. The process of claim 7 where in step (5) said liquid organic extractant is introduced in the second stage as a horizontal stream at or near the interface between said clarified-water layer and said particulate carbon to sweep off said carbon and to form with it a carbon-extractant dispersion.

18. The process of claim 7 wherein the liquid organic extractant from step (4) comprises the following mixture:

| Group | Carbon Range | | | Wt. % | | |
|---|---|---|---|---|---|---|
| Alcohols | $C_3$ | to | $C_{16}$ | 2 | to | 75 |
| Esters | $C_6$ | to | $C_{28}$ | 5 | to | 70 |
| Aldehydes | $C_3$ | to | $C_{16}$ | Nil | to | 25 |
| Ketones | $C_3$ | to | $C_{16}$ | Nil | to | 25 |
| Ethers | $C_6$ | to | $C_{28}$ | Nil | to | 50 |
| Acids | $C_3$ | to | $C_{16}$ | Nil | to | 10 |
| Olefins | $C_5$ | to | $C_{15}$ | Nil | to | 30 |
| Saturated Hydrocarbons | $C_5$ | to | $C_{28}$ | Nil | to | 50 |
| Water | | | | Nil | to | 15. |

19. The process of claim 7 wherein said liquid organic extractant comprises the following mixture:

| | Wt. % |
|---|---|
| Esters | 54 |
| Ethers | 20 |
| Aldehydes | 5 |
| Ketones | 5 |
| Acids | About 5 and below |
| Olefins | About 1 and below |
| Saturated hydrocarbons | About 1 and below |
| n-butyl alcohol | 3.4 |
| i-butyl alcohol | 0.6 |
| Alcohol ($C_5$-$C_8$) | 3.0 |
| Water | 2 |

20. The process of claim 7 in which said hydrocarbonaceous fuel is selected from the group consisting of various petroleum distillates and residues, naphtha, gas oil, residual fuel, whole crude, fuel oil, reduced crude; coal tar oil; shale oil; and tar sand oil; and said slurry of solid carbonaceous fuel is selected from the group consisting of particulate carbon, lignite, bituminous and anthracite coal in water or liquid hydrocarbon.

* * * * *